US012251714B2

(12) United States Patent
Königsson

(10) Patent No.: US 12,251,714 B2
(45) Date of Patent: Mar. 18, 2025

(54) METHOD OF CONTROLLING CENTRIFUGAL SEPARATOR AND CENTRIFUGAL SEPARATOR

(71) Applicant: Alfa Laval Corporate AB, Lund (SE)

(72) Inventor: Staffan Königsson, Tumba (SE)

(73) Assignee: ALFA LAVAL CORPORATE AB, Lund (SE)

( * ) Notice: Subject to any disclaimer, the term of this patent is extended or adjusted under 35 U.S.C. 154(b) by 857 days.

(21) Appl. No.: 17/291,659

(22) PCT Filed: Dec. 9, 2019

(86) PCT No.: PCT/EP2019/084152
§ 371 (c)(1),
(2) Date: May 6, 2021

(87) PCT Pub. No.: WO2020/120367
PCT Pub. Date: Jun. 18, 2020

(65) Prior Publication Data
US 2021/0402417 A1 Dec. 30, 2021

(30) Foreign Application Priority Data
Dec. 10, 2018 (EP) .................................... 18211245

(51) Int. Cl.
*B04B 11/04* (2006.01)
*B04B 1/14* (2006.01)

(52) U.S. Cl.
CPC ................ *B04B 11/04* (2013.01); *B04B 1/14* (2013.01)

(58) Field of Classification Search
CPC ........... B04B 11/04; B04B 1/14; B04B 11/02; B04B 13/00; B04B 1/10; B04B 1/12;
(Continued)

(56) References Cited

U.S. PATENT DOCUMENTS 3,410,479 A 11/1968 Nilson
3,580,493 A * 5/1971 Jonsson .................... B04B 1/14
494/10

(Continued)

FOREIGN PATENT DOCUMENTS

CN 101171086 A 4/2008
CN 108163867 A 11/2016
(Continued)

OTHER PUBLICATIONS

International Search Report, issued in PCT/EP2019/084152, dated Feb. 17, 2020.

(Continued)

*Primary Examiner* — Bion A Shelden
(74) *Attorney, Agent, or Firm* — Birch, Stewart, Kolasch & Birch, LLP

(57) ABSTRACT

A centrifugal separator and a method of controlling a centrifugal separator are disclosed. The centrifugal separator includes a rotor delimiting therein a separation space, an inlet for liquid feed mixture, a first outlet for heavy phase, a second outlet for light phase, and at least one channel extending towards a central portion of the rotor. The method includes separating liquid feed mixture into at least the heavy phase and the light phase in the separation space, and determining at the first outlet that a pressure build-up period has passed, and thereafter determining that an abrupt pressure change takes place at the first outlet, and controlling the centrifugal separator in response to the abrupt pressure change.

25 Claims, 5 Drawing Sheets

(58) Field of Classification Search
CPC .. B01D 17/0217; B01D 21/26; B01D 21/262; C02F 1/03
See application file for complete search history.

(56) References Cited

U.S. PATENT DOCUMENTS

| | | | | |
|---|---|---|---|---|
| 3,642,196 | A * | 2/1972 | Nilsson | B04B 11/04 494/10 |
| 3,983,257 | A | 9/1976 | Malmberg et al. | |
| 4,151,950 | A | 5/1979 | Gunnewig | |
| 4,810,374 | A | 3/1989 | Bruning et al. | |
| 6,358,193 | B1 | 3/2002 | Nyberg | |
| 6,837,842 | B1 * | 1/2005 | Dellden | B04B 1/08 494/10 |
| 8,337,378 | B2 | 12/2012 | Chan | |
| 9,186,687 | B2 | 11/2015 | Häggmark et al. | |
| 2013/0029828 | A1 * | 1/2013 | Haggmark | B04B 11/02 494/37 |
| 2014/0315704 | A1 | 10/2014 | Miller et al. | |
| 2014/0315705 | A1 * | 10/2014 | Miller | B04B 13/00 494/3 |
| 2015/0045199 | A1 * | 2/2015 | Thorwid | B04B 1/14 494/37 |
| 2015/0149098 | A1 * | 5/2015 | Daugela | G01F 1/00 702/50 |
| 2017/0135382 | A1 | 5/2017 | Avergård et al. | |

FOREIGN PATENT DOCUMENTS

| | | | | |
|---|---|---|---|---|
| EP | 3 085 449 | A1 | 10/2016 | |
| GB | 1099256 | | 1/1968 | |
| WO | WO 2008/098113 | A1 | 9/2006 | |
| WO | WO 2011/093784 | A1 | 8/2011 | |
| WO | WO 2015/150621 | A1 | 10/2015 | |
| WO | WO-2016170091 | A1 * | 10/2016 | B01D 17/0217 |

OTHER PUBLICATIONS

Written Opinion of the International Searching Authority, issued in PCT/EP2019/084152, dated Feb. 17, 2020.

English translation of the Chinese Office Action and Search Report for corresponding Chinese Application No. 201980081607.8, dated Jun. 24, 2022.

* cited by examiner

METHOD OF CONTROLLING CENTRIFUGAL SEPARATOR AND CENTRIFUGAL SEPARATOR

TECHNICAL FIELD

The present invention relates to a method of controlling a centrifugal separator. The present invention further relates to a centrifugal separator.

BACKGROUND

WO 2011/093784 discloses a centrifugal system wherein PID controllers are utilised for controlling various parameters such as recirculation flow and backpressure. A separator bowl of a centrifugal separator is also disclosed. Inside the separator bowl a liquid feed mixture is separated into a heavy component and a light component. The separator bowl is provided with outlet pipes for the heavy component. The outlet pipes follow an interior wall of the separator bowl radially inwardly and extend upwardly towards, and connect to, a heavy component outlet channel.

U.S. Pat. No. 4,151,950 discloses a centrifugal separator having control valves in a concentrated phase discharge passageway for control of the concentration of solids in the concentrated phase. The concentrated phase discharge passageway extends from a sludge chamber of a rotatable drum body of the centrifugal separator radially inwardly in a drum cover of the centrifugal separator. The control valves are hydraulically operated and have a control chamber for a control fluid. The control fluid is clear phase obtained by communicating the control chamber with a paring chamber for the clear phase.

U.S. Pat. No. 4,810,374 discloses a self-emptying centrifuge drum having an intake for a centrifugate, a peeling chamber that accommodates a peeling disk for diverting the clarified liquid, and an automatic device that senses the level of solids in the separating space of the drum. The sensing device consists of channels extending from the separating space to another peeling chamber with another peeling disk. The outflow channel from the second peeling disk communicates with a measuring instrument that operates in conjunction with controls that introduce the extracted solids into the drum.

A centrifugal separator comprises a separator rotor delimiting a separation space. Such a centrifugal separator may comprise at least one tube extending from a radially outer portion of the separation space towards a central portion of the separation space. A heavy phase separated from a liquid feed mixture is conducted via the at least one tube out of the separator rotor. The provision of the at least one tube provides for the heavy phase to be transported out of the separator rotor in a gentle manner, compared to if the heavy phase is ejected from a periphery of the separator rotor.

One challenge when operating a centrifugal separator of the above discussed kind comprising at least one tube for conducting the heavy phase is control of the flow of the heavy phase through the tube. When starting a separation process, part of the unseparated liquid feed mixture introduced into the separator rotor may escape via the at least one tube. On the other hand, if the heavy phase outlet is maintained closed for too long a period after start of the separation process, the separated heavy phase may compact within the separator rotor and block the at least one tube, and/or heavy phase may escape via an outlet for a light phase separated from the liquid feed mixture.

SUMMARY

It is an object to remedy, or at least alleviate, at least some of the above-mentioned problems. It would be advantageous to provide a method of controlling a centrifugal separator which ensures that a separated heavy phase flows out of a rotor of the centrifugal separator via an outlet for the heavy phase. Accordingly, there is provided a method as defined in an appended independent method claim related to a method of controlling a centrifugal separator. Further, it would be advantageous to provide a centrifugal separator devised such that a heavy phase flows reliably out of a separator rotor of the centrifugal separator via an outlet for the heavy phase. Accordingly, there is provided a centrifugal separator as defined in an appended independent claim related to a centrifugal separator.

According to an aspect of the invention, the object is achieved by a method of controlling a centrifugal separator configured to separate a heavy phase and a light phase from a liquid feed mixture. The centrifugal separator comprises a rotor delimiting therein a separation space, an inlet for the liquid feed mixture leading into the separation space, a first outlet for the heavy phase, a second outlet for the light phase, and at least one channel, extending from at least one radially outer portion, of the separation space towards a central portion of the rotor. The first outlet is arranged in fluid communication with the at least one channel.

The method comprises steps of:

- rotating the rotor,
- commencing supply of the liquid feed mixture into the separation space via the inlet,
- separating the liquid feed mixture into at least the heavy phase and the light phase in the separation space, and
- determining at the first outlet that a pressure build-up period has passed, and thereafter
- determining that an abrupt pressure change takes place at the first outlet, and
- controlling the centrifugal separator in response to the abrupt pressure change.

Since the method comprises the steps of:

- determining at the first outlet that a pressure build-up period has passed, and thereafter
- determining that an abrupt pressure change takes place at the first outlet, and
- controlling the centrifugal separator in response to the abrupt pressure change, it is ensured that the centrifugal separator is controlled based on a clearly identifiable condition related to the heavy phase separated from the liquid feed mixture. Thus, the flow of heavy phase out of the rotor is controllable. As a result, the above-mentioned object is achieved. For instance, light phase escaping via the first outlet, and/or heavy phase escaping via the second outlet, and/or heavy phase compacting at the radially outer portion of the separation space may be avoided.

According to a further aspect of the invention, the object is achieved by a centrifugal separator configured to separate a heavy phase and a light phase from a liquid feed mixture.

The centrifugal separator comprises a rotor delimiting therein a separation space, an inlet for the liquid feed mixture leading into the separation space, a first outlet for the heavy phase, a second outlet for the light phase, and at least one channel, extending from at least one radially outer portion, of the separation space towards a central portion of the rotor. The first outlet is arranged in fluid communication with the at least one channel. The centrifugal separator comprises a control unit and a pressure sensor connected to the control unit, wherein the pressure sensor is arranged to sense a pressure in the first outlet. The control unit is configured for:

- determining commencement of supply of the liquid feed mixture into the separation space,
- determining an abrupt pressure change in a pressure in the first outlet, and
- controlling the centrifugal separator in response to the abrupt pressure change.

Since the control unit is configured for:

- determining commencement of supply of the liquid feed mixture into the separation space,
- determining an abrupt pressure change in a pressure in the first outlet, and
- controlling the centrifugal separator in response to the abrupt pressure change, it is ensured that the centrifugal separator is controlled based on a clearly identifiable condition related to the heavy phase separated from the liquid feed mixture. Thus, the flow of heavy phase out of the rotor is controllable. As a result, the above-mentioned object is achieved. For instance, light phase escaping via the first outlet, and/or heavy phase escaping via the second outlet, and/or heavy phase compacting at the radially outer portion of the separation space may be avoided.

The centrifugal separator may also be referred to as a disc stack centrifugal separator. The centrifugal separator may be a high speed separator, i.e. a centrifugal separator wherein the rotor is rotated at one or more thousands of revolutions per minute, rpm. The rotor may also be referred to as a, separator rotor, a separator bowl, or a bowl.

One or more inner surfaces of the separator rotor limit the separation space. The radially outer portion of the separation space refers to the outward bounds of the separation space, as opposed to the middle and central portions of the separation space. The at least one radially outer portion of the separation space is arranged at the periphery of the separation space.

During separation of the liquid feed mixture into the light phase and the heavy phase, the heavy phase is collected in a circumferential portion at the periphery of the separation space. The circumferential portion extends in a circumferential direction of the separator rotor and thus, may form an imaginary ring or torus inside the separation space.

While the centrifugal separator is in operation, the heavy phase in the at least one radially outer portion of the separation space and the circumferential portion leaves the separation space via the at least one channel. Since liquid phase is continuously admitted into the separation space, the circumferential portion is continuously refilled with newly separated heavy phase.

It has been realised by the inventor that an abrupt pressure change takes place in the at least one channel and thus, also at the first outlet, when the heavy phase separated in the circumferential portion at the periphery of the separation space has reached a level covering an opening of the at least one channel at the at least one radially outer portion, of the separation space.

Moreover, it has been realised by the inventor that determining when this pressure change takes place, or that this pressure change has taken place, can be utilised for controlling the centrifugal separator.

Further, it has been realised by the inventor that this pressure change may be utilised for controlling a flow of the heavy phase out of the centrifugal separator, e.g. for avoiding un-separated liquid feed, i.e. light phase and heavy phase, from escaping via the first outlet, or for preventing the heavy phase from escaping via the second outlet.

The liquid feed mixture may have a solid matter content. The solid matter may be separated from the liquid feed mixture as part of the heavy phase. Thus, the heavy phase may form a solid matter suspension, such as a concentrated solid matter suspension.

The step of determining at the first outlet that a pressure build-up period has passed may be performed in a number of alternative ways. The purpose of this step may be inter alia to ensure that the separation space has been filled and that liquid has reached the first and second outlets. Moreover, the pressure build-up period should not be mistaken for the abrupt pressure change to be determined in the subsequent step of determining that an abrupt pressure change takes place at the first outlet.

The step of determining that an abrupt pressure change takes place at the first outlet may be performed in a number of alternative ways. The abrupt pressure change indicates that the heavy phase separated in the circumferential portion at the periphery of the separation space has reached a level covering a radially outer opening of the at least one channel, i.e. an opening of the channel at the radially outer portion, of the separation space.

During the steps of determining at the first outlet that a pressure build up period has passed and determining that an abrupt pressure change takes place at the first outlet, the first outlet may be maintained closed or alternatively, may be opened a minute amount. Depending on whether the first outlet is closed or opened, the abrupt pressure change may be to an increasing pressure or a decreasing pressure.

The step of controlling the centrifugal separator in response to the abrupt pressure change may comprise one of a number of different control measures of the centrifugal separator.

Since the abrupt pressure change relates to the separated heavy phase, control measures may relate to the heavy phase. For instance, the first outlet may be opened to provide a flow of heavy phase from the centrifugal separator.

According to embodiments, the method may comprise a step of:

- determining a first time period from the step of commencing supply of the liquid feed mixture into the separation space until the step of determining that an abrupt pressure change takes place at the first outlet. In this manner, basis may be provided for determining and/or controlling parameters of the operation of the centrifugal separator.

According to embodiments, the method may comprise a step of:

- determining a flow rate of the liquid feed mixture through the inlet. In this manner, basis may be provided for determining and/or controlling parameters of the operation of the centrifugal separator.

According to embodiments, wherein each of the at least one channel, comprises an outer end at the at least one radially outer portion, of the separation space, wherein the separation space comprises a heavy phase volume extending from a radially outermost circumference of the separation space to a radial position at the outer end, the method may comprise a step of:

- calculating a heavy phase content of the liquid feed mixture based on the heavy phase volume of the separation space, the flow rate of the liquid feed mixture flow, and the first time period. In this manner, the heavy phase content of the liquid feed mixture may be calculated when the method is performed. Since the heavy phase content of the liquid feed mixture may vary substantially over time, knowledge about the current heavy phase content may be advantageous. The alternative of using a dedicated inline sensor for measuring the heavy phase content of the liquid feed mixture may be expensive, and depending on the particular liquid feed mixture, not even possible.

Above, two features of a method related to a centrifugal separator have been discussed: a first feature related to a method of controlling a centrifugal separator in response to an abrupt pressure change at the first outlet; and a second feature related to calculating a heavy phase content of the liquid feed mixture.

According to embodiments, each of the at least one channel may comprise a tube, which tube extends from the at least one radially outer portion of the separation space towards the central portion of the rotor, and wherein the first outlet is arranged in fluid communication with the tube. In this manner, the centrifugal separator may be particularly suited for separating a heavy phase forming a concentrated solid matter suspension from the liquid feed mixture.

The provision of the at least one channel in the form of a tube provides for the heavy phase to be transported out of the separator rotor in a gentle manner, compared to if the heavy phase is ejected from a periphery of the separator rotor. The gentle treatment may be advantageous e.g. when the heavy phase comprises living matter, such as e.g. yeast, or other cells. Gentle treatment may also be advantageous when separating active substances for the manufacturing of pharmaceutical drugs.

According to embodiments, the rotor may comprise intermittently openable outlet openings, and the method may comprise steps of:

discharging one or more fractions of the liquid feed mixture via the outlet openings, and repeating at least the steps of: rotating the rotor, commencing supply of the liquid feed mixture, separating the liquid feed mixture, determining that pressure build-up period has passed, determining abrupt pressure change, and controlling the centrifugal separator, of the method. In this manner, the method may be performed each time after the step of discharging via the outlet openings. Thus, each time e.g., light phase escaping via the first outlet, and/or heavy phase escaping via the second outlet, and/or heavy phase compacting at the radially outer portion of the separation space may be avoided.

Further features of, and advantages with, the invention will become apparent when studying the appended claims and the following detailed description.

BRIEF DESCRIPTION OF THE DRAWINGS

Various aspects and/or embodiments of the invention, including its particular features and advantages, will be readily understood from the example embodiments discussed in the following detailed description and the accompanying drawings, in which.

DETAILED DESCRIPTION

Aspects and/or embodiments of the invention will now be described more fully. Like numbers refer to like elements throughout. Well-known functions or constructions will not necessarily be described in detail for brevity and/or clarity.

Figure 1:
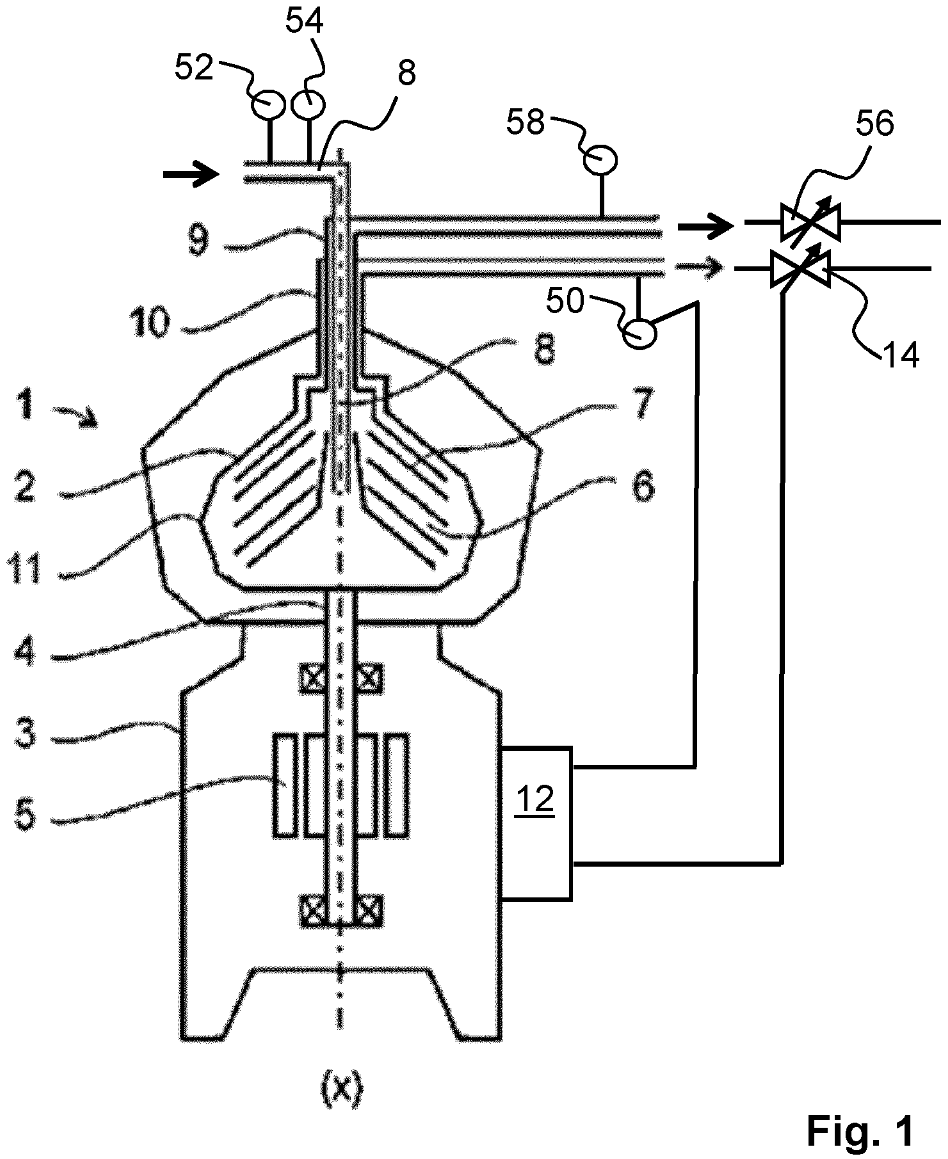
FIG. 1 schematically illustrates a cross section through a centrifugal separator.

FIG. 1 schematically illustrates a cross section through a centrifugal separator 1 according to embodiments. The centrifugal separator 1 comprises a rotor arrangement 2 and a drive arrangement 5. The rotor arrangement 2 comprises a rotor 11 and a spindle 4. Thus, the centrifugal separator 1 comprises the rotor 11. The spindle 4 is supported in a housing 3 of the centrifugal separator 1, e.g. via two bearings. The housing 3 may comprise more than one individual part, i.e. the housing 3 may be assembled from several parts. The drive arrangement 5 is configured to rotate the rotor 11, i.e. the rotor 11 and the spindle 4, about a rotation axis (X) at a rotational speed.

In these embodiments, the drive arrangement 5 forms part of the spindle 4. That is, the rotor arrangement 2 is directly driven by the drive arrangement 5. The drive arrangement 5 comprises an electric motor and a rotor of the electric motor forms part of the spindle 4. In alternative embodiments, the drive arrangement may instead be connected to the spindle. Such alternative embodiments may comprise an electric motor connected to the spindle, e.g. via cog wheels, or a belt drive.

The rotor 11 delimits a separation space 6 therein. Inside the separation space 6, continuous centrifugal separation of a liquid feed mixture takes place during operation of the centrifugal separator 1. Inside the separation space 6 there is arranged a stack of frustoconical separation discs 7. The separation discs 7 provide for an efficient separation of the liquid feed mixture into at least a light phase and a heavy phase. The stack of frustoconical separation discs 7 is fitted centrally and coaxially with the rotation axis (X), and rotates together with the rotor 11.

The centrifugal separator 1 may be configured for separating the liquid feed mixture into at least the light phase and the heavy phase. The liquid feed mixture may comprise e.g. one liquid, or two liquids. The liquid feed mixture may comprise solid matter, which may be separated from the liquid feed mixture as part of the heavy phase.

The centrifugal separator 1 comprises an inlet 8 for the liquid feed mixture, a first outlet 10 for the heavy phase, and a second outlet 9 for the light phase. In the illustrated embodiments, the liquid feed mixture to be separated is fed from the top of the centrifugal separator 1 via the inlet 8 centrally down into the rotor 11, from which it is distributed to the separation space 6. During use of the centrifugal separator 1, the liquid feed mixture is separated into at least the heavy phase and the light phase in the separation space 6. The light phase flows towards the centre of the separation space 6 and the heavy phase flows towards a radially outer periphery of the separation space 6. The separated light phase is lead from a central portion of the separation space 6 upwardly to the second outlet 9. That is, the second outlet 9 is arranged in fluid communication with the central portion of the separation space 6.

From a central portion of the rotor 11, the heavy phase is lead upwardly to the first outlet 10.

How the heavy phase is directed from the radially outer periphery of separation space 6 to the central portion of the rotor 11 is discussed in more detail with reference to FIG. 2 below.

The present invention is not limited to any particular types of liquid feed mixtures or separated fluid phases. Neither is the present invention limited to any particular inlet arrangement for the liquid feed mixture, nor to any particular second outlet 9 for the separated light phase.

The centrifugal separator 1 further comprises a control unit 12 configured to control the operation of the centrifugal separator 1. As will be explained in more detail below, the control unit 12 is configured to control e.g. valves of the centrifugal separator 1. The control unit 12 may further be configured to calculate parameters of the centrifugal separator 1, and/or liquid feed mixture, and/or the separated phases. The control unit 12 may be configured to control the drive arrangement 5, e.g. to start and stop the drive arrangement 5.

The centrifugal separator 1 may comprise one or two hermetically sealed outlets. That is, the centrifugal separator 1 may be provided with mechanical seals between the rotor 11 and one or both of the first and second outlets 10, 9. Suitably, the inlet 8 is a hermetically sealed inlet.

That is, the centrifugal separator 1 may be provided with a mechanical seal between the rotor 11 and the inlet 8. A mechanical seal provides a seal between an inside of the rotor 11 and an ambient environment around the rotor 11. The mechanical seal may provide a seal between conduits in the rotatable rotor 11 and conduits in stationary parts of the centrifugal separator 1, such as e.g., the first and second outlets 10, 9, and the inlet 8, which are stationary in relation to the rotor 11. A liquid seal which provides a seal between an inside of the rotor 11 and an ambient environment around the rotor 11, on the other hand, such as e.g. provided by a paring disc arranged in a paring chamber of the rotor, does not constitute a hermetical seal.

According to some embodiments the first and second outlets 10, 9 may be hermetically sealed outlets. That is, mechanical seals may be provided between the rotor 11 and stationary parts of the first and second outlets 10, 9 arranged at the rotor 11.

According to some embodiments, the inlet 8 may be a hermetically sealed inlet. That is, a mechanical seal may be provided between the rotor 11 and stationary parts of the inlet 8 arranged at the rotor 11.

Figure 2:
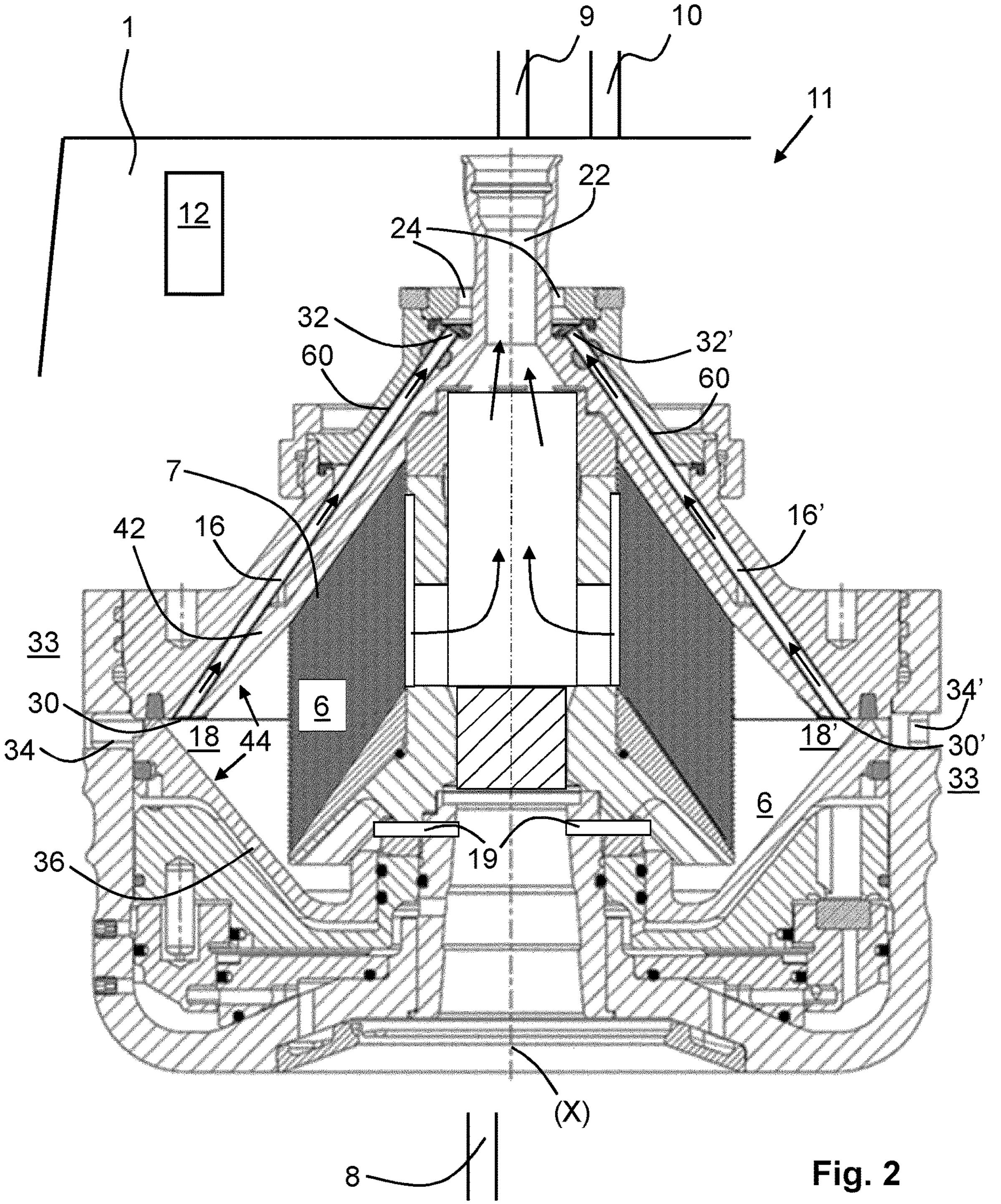
FIG. 2 illustrates a cross section through a rotor, FIG. 3 discloses schematically a cross-sectional portion of a rotor, FIGS. 4*a* and 4*b* disclose a pressure at an outlet of a centrifugal separator, FIG. 5 discloses a method of controlling a centrifugal separator.

FIG. 2 illustrates a cross section through a rotor 11 according to embodiments. The rotor 11 is a rotor of a centrifugal separator 1, such as e.g. the centrifugal separator 1 shown in FIG.

1. Again, the rotor 11 is configured to be rotated around a rotation axis (X) and delimits a separation space 6 with a stack of frustoconical separation discs 7. Again, the centrifugal separator 1 comprises a control unit 12.

These embodiments resemble in much the embodiments of FIG. 1. The main difference is that in these embodiments, the liquid feed mixture is lead into the separation space 6 via the schematically illustrated inlet 8 from a lower side of the rotor 11. Passages 19 for conducting the liquid feed mixture into the separation space 6 are schematically illustrated in FIG. 2. A separated heavy phase is lead upwardly at a central portion of the rotor 11 via a heavy phase conduit 24 to a first outlet 10 of the centrifugal separator 1. From a central portion of the separation space 6, a separated light liquid phase is lead upwardly via a light phase conduit 22 to a second outlet 9 of the centrifugal separator 1. The flow of the light phase in a central portion of the rotor 11 is indicated with arrows in FIG. 2.

At least one channel 16, 16' extends from at least one radially outer portion 18, 18' of the separation space 6 towards the central portion of the rotor 11. The first outlet 10 is arranged in fluid communication with the at least one channel 16, 16'. The at least one channel 16, 16' has an outer end 30, 30' arranged at the at least one radially outer portion 18, 18' and an inner end 32, 32' arranged towards the central portion of the rotor 11 and the heavy phase conduit 24. Thus, the first outlet 10 of the centrifugal separator is arranged in fluid communication with the outer end 30, 30' of the at least one channel 16, 16'. The at least one radially outer portion 18, 18' is arranged at at least one peripheral portion of the separation space 6.

In the embodiments of FIG. 2 each of the at least one channel 16, 16' comprises a tube 60. That is, the channels 16, 16' are formed by tubes 60. Accordingly, only tubes 60 may extend from the at least one radially outer portion 18, 18' of the separation space 6 towards the central portion of the rotor 11. Also, the first outlet 10 is arranged in fluid communication with the tubes 60.

In these embodiments, the rotor 11 comprises two tubes 60. In alternative embodiments, the rotor 11 may comprise only one tube, or more than two tubes, such as e.g. four tubes, seven tubes, ten tubes, or twelve tubes. In the following description reference may be made to one channel 16, or to one tube 60. However, the discussion applies to any other channel 16, or tube 60, respectively, arranged in the same manner in the rotor 11.

During separation of the liquid feed mixture, the separated heavy phase is collected at the peripheral portion of the separation space 6. Thus, the separated heavy phase forms a heavy phase accumulation at a periphery of the separation space 6. Via the channel 16, heavy phase from the heavy phase accumulation is conducted to the central portion of the rotor 11. A pressure difference between the radially inner end 32 of the channel 16 and the radially outer end 30 of the channel 16 promotes the flow of the heavy phase from the peripheral portion of the separation space 6 towards the central portion of the rotor 11. The flow of the heavy phase in the channel 16 is indicated with arrows in FIG. 2.

Mentioned as an example, the tube 60 may have an inner diameter within a range of 2-10 mm. The inner diameter may be selected depending on the number of tubes 60 and on the amount and viscosity of the heavy phase to be separated from the liquid feed mixture. A suitable flow speed of the heavy phase in the tube 60 to prevent blockage of the at least one tube 60 is pursued. Mentioned as examples, a flow speed of 0.5 m/s may be suitable for many types of heavy phase, however, some types of heavy phase may only require a flow speed of as low as 0.05 m/s.

According to some embodiments, the rotor 11 may comprise intermittently openable outlet openings 34, 34'. More specifically, the rotor 11 may comprise one or more outlet openings 34, 34' at a radially outer periphery of the rotor 11. The outlet openings 34, 34' connect a radially outer periphery of the separation space 6 with a housing space 33 outside the rotor 11 and within the separator 1. The outlet openings 34, 34' may be intermittently opened. A discharge slide 36, also referred to as sliding bowl bottom, may be utilised in a known manner for opening and closing the outlet openings 34, 34'. The outlet openings 34, 34' may alternatively be referred to as discharge ports.

Purely mentioned as examples, the outlet openings 34, 34' may be opened if one or more of the at least one channel 16, 16' should be blocked, to relieve the rotor 11 of imbalances caused by uneven distribution of matter within the separation space 6, or to empty the separation space 6 from sludge, e.g. sludge containing impurities other than the constituents of the light phase and the heavy phase.

Inside the rotor 11 an insert 42 is arranged. The insert 42 is arranged radially outside the stack of separation discs 7. The tubes 60 are secured inside the rotor 11 in the insert 42. An inner surface of the insert 42 forms part of an inner surface 44 of the rotor 11.

Figure 6:
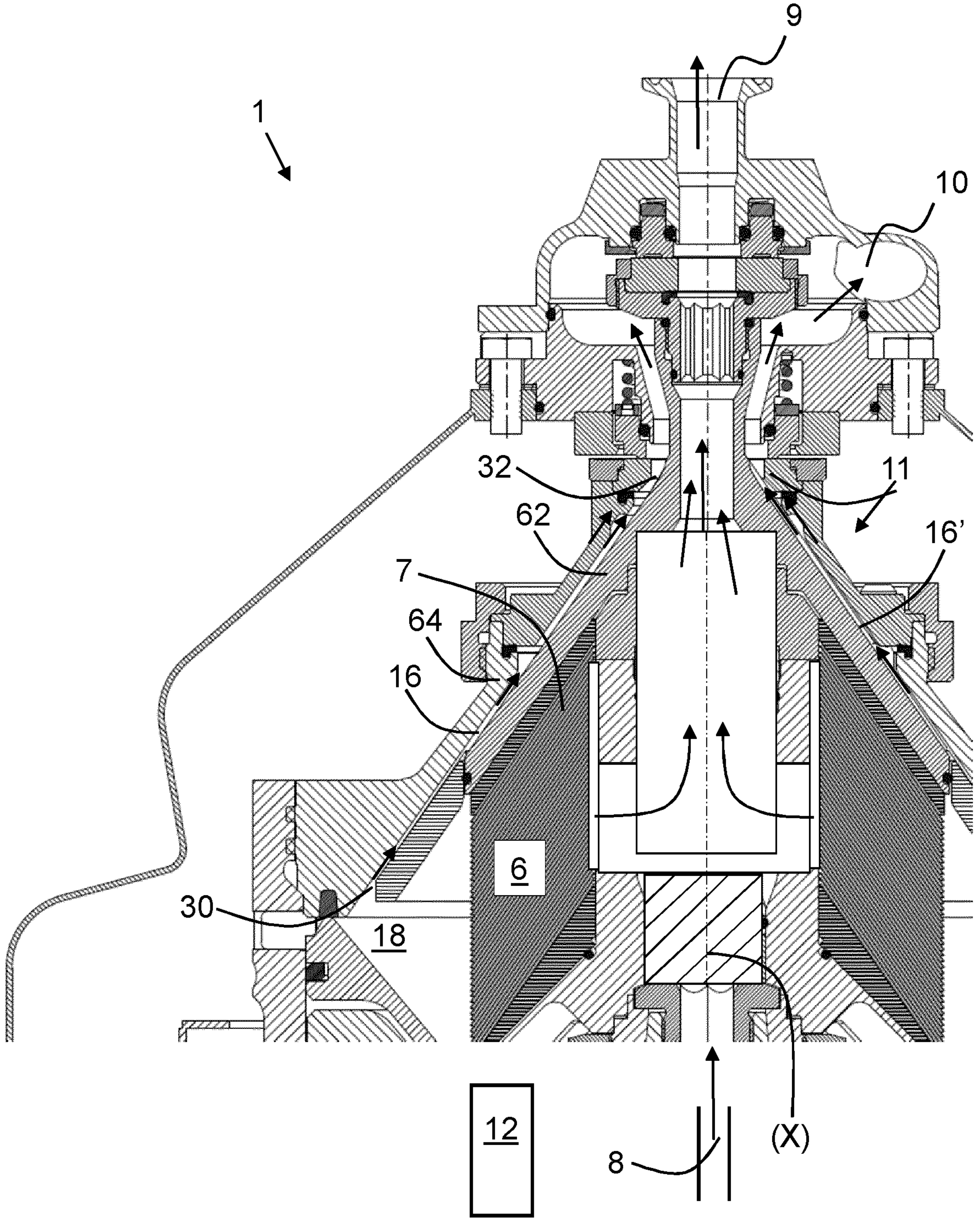
FIG. 6 illustrates a cross section through a rotor.

FIG. 6 illustrates a cross section through a rotor 11 according to embodiments. The rotor 11 is a rotor of a centrifugal separator 1, such as e.g. the centrifugal separator 1 shown in FIG. 1. Again, the rotor 11 is configured to be rotated around a rotation axis (X) and delimits a separation space 6 with a stack of frustoconical separation discs 7. The centrifugal separator comprises an inlet 8 and first and second outlets 10, 9. Arrows indicate the flow of the liquid feed mixture, the heavy phase and the light phase. Again, the centrifugal separator 1 comprises a control unit 12.

These embodiments resemble in much the embodiments of FIGS. 1 and 2. Accordingly, the main differences will be discussed in the following.

Again, at least one channel 16, 16' extends from at least one radially outer portion 18, 18' of the separation space 6 towards the central portion of the rotor 11. The first outlet 10 is arranged in fluid communication with the at least one channel 16, 16'. Each of the at least one channel 16, 16' has an outer end 30 arranged at the at least one radially outer portion 18 and an inner end 32 arranged towards the central portion of the rotor 11. Thus, the first outlet 10 of the centrifugal separator 1 is arranged in fluid communication with the outer end 30, 30' of the at least one channel 16, 16'.

In the embodiments of FIG. 6 each of the at least one channel 16, 16' is formed between a top disc 62 and an outer casing 64 of the rotor 11. The channels 16, 16' may be delimited from each other by radially extending ridges formed in e.g. the top disc 62.

In the following discussion reference is made to FIGS. 1, 2 and 6.

The control unit 12 comprises a calculation unit which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilised expression calculation unit may represent a processing circuitry comprising a plurality of processing circuits, such as, e.g., any, some or all of the ones mentioned above. The control unit may comprise a memory unit. The calculation unit is connected to the memory unit, which provides the calculation unit with, for example, the stored programme code and/or stored data which the calculation unit needs to enable it to do calculations. The calculation unit may also be adapted to storing partial or final results of calculations in the memory unit. The memory unit may comprise a physical device utilised to store data or programs, i.e., sequences of instructions, on a temporary or permanent basis. The control unit 12 is connected inter alia to one or more sensors and/or one or more controllable devices, such as e.g. controllable valves.

The control unit 12 of the centrifugal separator 1 may be configured to perform one or more steps of the method 100, discussed below with reference to FIG. 5. According to specific embodiments, the control unit 12 may be configured to control steps related to controlling a flow of the heavy phase from the centrifugal separator 1.

The centrifugal separator 1 comprises a pressure sensor 50 connected to the control unit 12, The pressure sensor 50 is arranged to sense a pressure in the first outlet 10. The control unit 12 is configured for:

- determining commencement of supply of the liquid feed mixture into the separation space 6,
- determining an abrupt pressure change in a pressure in the first outlet 10, and
- controlling the centrifugal separator 1 in response to the abrupt pressure change.

The control unit 12 may determine commencement of supply of the liquid feed mixture into the separation space 6 in a number of alternative ways. For instance, a control signal from the control unit 12, or from a different control unit, for starting flow of the liquid feed mixture to the inlet 8 may be utilised for determining the commencement of the supply of the liquid feed mixture. The control signal may for instance be provided to a valve and/or pump (not shown) connected to the inlet 8. Alternatively, a flow meter, or a flow sensor, or a pressure sensor 54 arranged in the inlet 8 may provide a signal to the control unit 12 indicating commencement of supply of the liquid feed mixture into the separation space 6.

The pressure sensor 50 provides pressure measurement data to the control unit 12. Thus, by monitoring these pressure measurement data, the control unit 12 can determine an abrupt pressure change at the first outlet 10.

It has been found out by the inventor that an abrupt pressure change in a pressure in the first outlet 10 relates to a particular condition inside the separation space 6. The abrupt pressure change relates to the amount of heavy phase separated inside the rotor 11 and accumulated at the radially outer periphery of the separation space 6. Thus, by controlling the centrifugal separator in response to the abrupt pressure change, it may be ensured that the centrifugal separator 1 is controlled based on a clearly identifiable condition related to the heavy phase separated from the liquid feed mixture.

According to embodiments, the control unit 12 may further be configured for:

- determining at the first outlet 10 that a pressure build-up period has passed. In this manner, any initial pressure changes, e.g. related to the initial filling of the separation space 6 with unseparated liquid feed mixture, may not be mistaken for the abrupt pressure change related to the separated heavy phase within the separation space 6. Thus, the abrupt pressure change in the pressure in the first outlet 10 only after the pressure build-up period has passed may be taken into account for controlling the centrifugal separator 1.

According to embodiments, the centrifugal separator 1 may comprise a first outlet valve 14 arranged in fluid communication with the first outlet 10. The first outlet valve 14 may be connected to the control unit 12. The control unit 12 may be configured for:

- controlling the first outlet valve 14 in response to the abrupt pressure change, such as opening at least partially the first outlet valve 14. In this manner, the controlling of the centrifugal separator 1 in response to the abrupt pressure change may comprise the controlling of the first outlet valve 14.

The abrupt pressure change takes place at the first outlet 10 when the heavy phase separated in the circumferential portion at the periphery of the separation space 6 has reached a level covering the opening of the at least one channel 16, 16' at the outer end 30, 30' of the at least one channel 16, 16' at the at least one radially outer portion 18, 18' of the separation space 6.

Controlling the first outlet valve 14 in response to the abrupt pressure change provides the advantage that the separation of the liquid feed mixture into the heavy and light phases is permitted to have commenced and resulted in a certain defined amount of separated heavy phase inside the separation space 6. Thus, controlled influence over flow of heavy phase through the first outlet 10 may be achieved.

According to embodiments, the control unit 12 may be configured for:

determining a first time period, $T_1$, from the commencement of supply of the liquid feed mixture into the separation space 6 until the determining that an abrupt pressure change takes place at the first outlet 10. In this manner, the separation process inside the centrifugal separator 1 may be monitored.

The control unit 12 may comprise a timer, or a programmed timer function, to be utilised for determining the first time period, $T_1$.

According to embodiments, the centrifugal separator 1 may comprising a flow meter 52 at the inlet 8. The control unit 12 may be configured for:

determining a flow rate of the liquid feed mixture, $Q_{tot}$, through the inlet 8. In this manner, the flow of the liquid feed mixture into the centrifugal separator 1 may be monitored.

The flow meter 52 is connected to the control unit 12 for providing flow measurement data to the control unit 12.

According to embodiments, the control unit 12 may be configured for:

calculating heavy phase content in the liquid feed mixture based on a heavy phase volume, $V_{HP}$, of the separation space 6, the flow rate of the liquid feed mixture flow, $Q_{tot}$, and the first time period, $T_1$. In this manner, further control over the separation of the liquid feed mixture centrifugal separator 1 may be provided.

The heavy phase content, $\%_{HP}$, (volume %) of the liquid feed mixture may be calculated using the formula:

$$\%_{HP}=V_{HP}/(Q_{tot}*T_1)$$

Since the heavy phase content of the liquid feed mixture may vary over time, a recent calculation of the heavy phase content, $\%_{HP}$, may provide up-to-date data for the control of the centrifugal separator 1. Each time the liquid feed mixture is supplied into the separation space 6, e.g. after an intermittent emptying of the separation space 6 via the outlet openings 34, 34', as discussed above, the heavy phase content, $\%_{HP}$, may be calculated.

The heavy phase content, $\%_{HP}$, may for instance be utilised for determining that separated heavy phase flows unimpededly from the separation space 6 to the first outlet 10. In case of blockage of one or more of the at least one channel 16, 16' the flow of heavy phase through the first outlet 10 will be too low in comparison with the heavy phase content, $\%_{HP}$, of the liquid feed mixture.

The heavy phase content, $\%_{HP}$, and the flow rate of the liquid feed mixture, $Q_{tot}$, through the inlet 8 may be utilised for determining the time it takes to fill up a partial volume of the separation space 6 with separated heavy phase. This in turn may be utilised for determining when the first outlet 10 is to be opened for flow of heavy phase.

Knowledge of the heavy phase content, $\%_{HP}$, in the form of solid matter content in the liquid feed mixture may be utilised for providing a suitable solid matter content in the flow of heavy phase through the first outlet 10 by adjusting a suitable flow of light phase through the second outlet 9. The difference between the flow of liquid feed mixture through the inlet 8 and the light phase in the second outlet 9 together with the solid matter content, $\%_{HP}$, provides the solid matter content in the flow of heavy phase through the first outlet 10. Mentioned purely as an example, when separating a heavy phase containing yeast as solid matter from a liquid feed mixture, the solid matter content in the heavy phase may be approximately 80%. A further example is a liquid feed mixture comprising bacteria as solid matter, wherein the solid matter content is 70-80%.

According to embodiments, the centrifugal separator 1 may comprise a second outlet valve 56 arranged in fluid communication with the second outlet 9. The second outlet valve 56 is connected to the control unit 12. The control unit 12 may be configured for:

controlling a flow of the light phase in the second outlet 9. In this manner, the control unit 12 may control the flow of the light phase out of the centrifugal separator 1 via the second outlet valve 56.

Such control of the flow of the light phase may for instance be utilised after a start of the separation process to ensure that only separated light phase will flow through the second outlet 9. During an ongoing separation process, the back pressure may be controlled by controlling the flow of the light phase in the second outlet 9. For instance, the flow of heavy phase through the first outlet 10 may be controlled by controlling the flow of light phase via the second outlet valve 56, and/or the back pressure may be increased in order to avoid too low a pressure/flow at the first outlet 10.

Optionally, there may be provided a pressure sensor 54 at the inlet 8. The pressure sensor 54 may be connected to the control unit 12 for providing pressure measurement data to the control unit 12.

Optionally, there may be provided a pressure sensor 58 at the second outlet 9. The pressure sensor 58 may be connected to the control unit 12 for providing pressure measurement data to the control unit 12.

Figure 3:
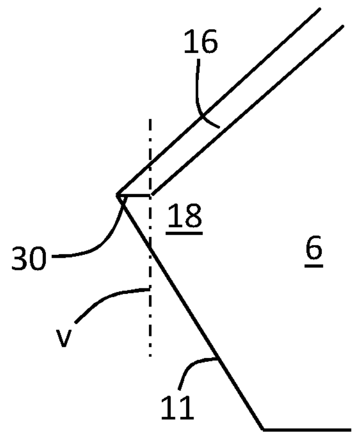
Figure 4A:
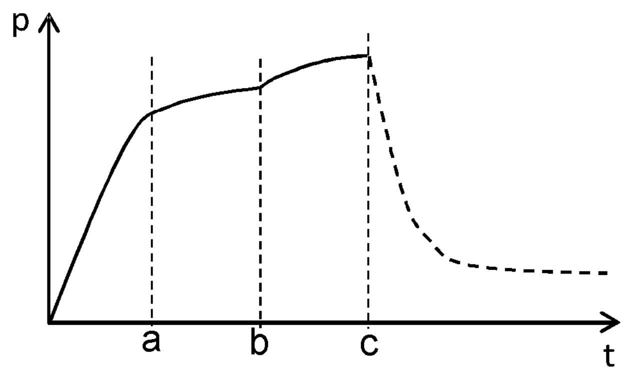
Figure 4B:
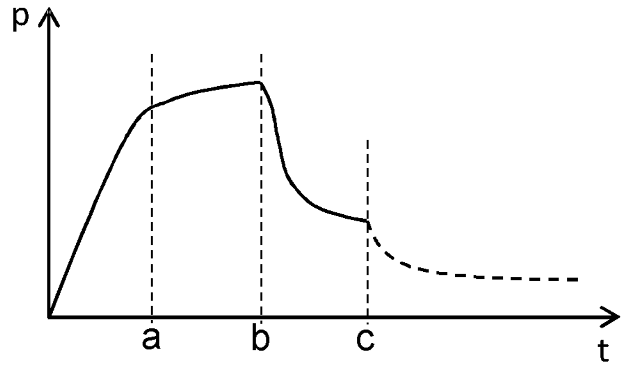

With reference to FIGS. 3, 4*a* and 4*b*, pressure changes, in particular at the first outlet 10 of the centrifugal separator 1, will be discussed.

FIG. 3 discloses schematically a cross-sectional portion of the rotor 11 of the centrifugal separator 1 discussed with reference to FIGS. 1 and 2. The channel 16 and its outer end 30 arranged at the at least one radially outer portion 18 of the separation space 6 are specifically shown. A vertical line V indicates a radial level within the separation space 6, outside which the outer end 30 of the channel 16, i.e. the radially outer opening of the channel 16, is arranged.

FIGS. 4*a* and 4*b* disclose the pressure, p, change at the first outlet 10 over time, t, in accordance with two different embodiments.

As the liquid feed mixture is supplied into the separation space 6, the pressure build-up is similar in both embodiments. During an initial pressure build-up period while the separation space 6 is filled with liquid feed mixture pressure at the first outlet 10 increases rapidly up to a pressure level at a point in time indicated with line a.

Thereafter, as the liquid feed mixture is separated into the heavy phase and the light phase, the pressure at the first outlet 10 increases at a much slower rate gradually up to a pressure level at a point in time indicated with line b. It is the gradual accumulation of heavy phase at the outer circumference of the separation space 6 which causes this gradual increase in pressure. The separated heavy phase forms a ring, or torus, at the outer circumference of the separation space 6. As the amount of separated heavy phase increases, the ring or torus increases in volume.

When the separation space 6 is filled with separated heavy phase up to a level covering the outer end 30 of the channel 16, i.e. reaching the vertical line V, an abrupt pressure change in the first outlet 10 takes place as more separated heavy phase is accumulated at the outer circumference of the separation space 6, radially inside the vertical line V.

In the embodiments of FIG. 4*a*, the first outlet valve 14 is maintained closed, which causes an abrupt pressure change in the form of an abrupt pressure increase. In the embodiments of FIG. 4*b*, the first outlet valve 14 is arranged in a marginally open position, which causes an abrupt pressure change in the form of an abrupt pressure decrease. The marginally open position of the first outlet valve 14 provides only a minute flow through the first outlet 10. The minute flow is minute in comparison with ordinary flow rates of the separated heavy phase once continuous separation of the liquid feed mixture into the light and heavy phases is performed and the first outlet valve is opened. Mentioned as an example, the minute flow may have a flow rate which is ≤0.5% of the maximum flow rate of separated heavy phase.

In both embodiments however, an abrupt pressure change takes place. The abrupt pressure change may be monitored by the control unit 12.

At the point in time indicated by line c, the first outlet valve 14 is opened and the heavy phase flows through the first outlet 10 out of the centrifugal separator. Continuous separation of the liquid feed mixture into the light and heavy phases takes place. During continuous separation, when the first outlet 10 is open, the heavy phase in the at least one radially outer portion 18 of the separation space 6 leaves the separation space 6 via the at least one channel 16. Since liquid feed mixture is continuously supplied into the separation space 6, the circumferential portion of the separation space 6 and the radially outer portion 18 is continuously refilled with newly separated heavy phase.

In case outlet openings 34, 34' as discussed above with reference to FIG. 2, are opened, and the separation space 6 is at least partially emptied, pressure build-up as discussed above, is again repeated as liquid feed mixture again is supplied into the separation space 6.

Figure 5:
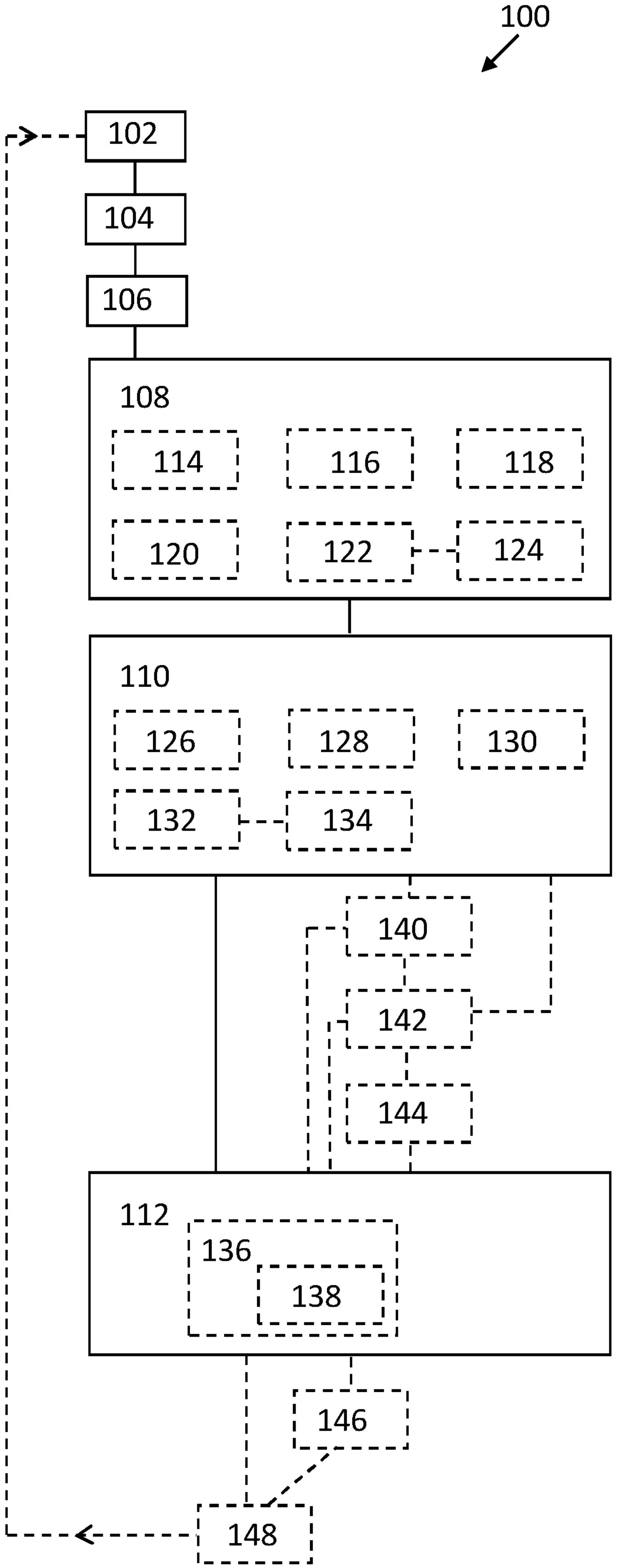

FIG. 5 discloses a method 100 of controlling a centrifugal separator configured to separate a heavy phase and a light phase from a liquid feed mixture. The centrifugal separator may be a centrifugal separator 1 according to embodiments described in connection with FIGS. 1, 2 and 6. In the following reference is also made to FIGS. 1-4*b*, and 6.

The method 100 comprises steps of:

- rotating 102 the rotor 11,
- commencing 104 supply of the liquid feed mixture into the separation space 6 via the inlet 8,
- separating 106 the liquid feed mixture into at least the heavy phase and the light phase in the separation space 6, and
- determining 108 at the first outlet 10 that a pressure build-up period has passed, and thereafter
- determining 110 that an abrupt pressure change takes place at the first outlet 10, and
- controlling 112 the centrifugal separator 1 in response to the abrupt pressure change.

The step of rotating 102 the rotor 11 is performed by the drive arrangement 5 rotating the spindle 4 and thus also the rotor 11.

The step of commencing 104 supply of the liquid feed mixture may be performed by opening of a valve, and/or starting of the pump, connected to the inlet 8. The valve may be opened and/or the pump may be started by an operator of the centrifugal separator 1. Alternatively, the control unit 12 may be set to open the valve and/or start the pump at appropriate moments during an automated control of the supply of the liquid feed mixture into the separation space 6.

The step of determining 110 that an abrupt pressure change takes place at the first outlet 10 may be performed by the control unit 12 monitoring the measurement data from the pressure sensor 50.

The step of separating 106 the liquid feed mixture is performed in a known manner inside the separation space 6 as the rotor 11 is rotated.

The step of determining 108 at the first outlet 10 that a pressure build-up period has passed may be performed in a number of alternative ways, see below.

The step of determining 110 that an abrupt pressure change takes place at the first outlet 10 may be performed in a number of alternative ways, see below.

According to embodiments, the step of determining 108 at the first outlet 10 that a pressure build-up period has passed may comprise a step of:

- determining 114 that a predetermined time interval has passed from the step of commencing 104 supply of the liquid feed mixture into the separation space 6, or
- determining 116 that a threshold pressure level has been reached at the first outlet 10, or
- determining 118 that a threshold differential pressure level has been reached between a pressure at the first outlet 10 and a pressure at the second outlet 9, or
- determining 120 that a threshold differential pressure level has been reached between a pressure at the first outlet 10 and a pressure at the inlet 8, or
- tracking 122 a pressure at the first outlet 10 and evaluating 124 a pressure change at the first outlet 10. In this manner, it may be ensured that the pressure build-up period has passed, and that the next step of the method 100, i.e. the step of determining 110 that an abrupt pressure change takes place at the first outlet 10, may be performed.

The step of determining 114 that a predetermined time interval has passed may be performed by a timer, or a programmed timer function, the control unit 12. The predetermined time interval may e.g. be set based on one or more of the flow rate of the liquid feed mixture, the heavy phase content of the liquid feed mixture, and/or a volume of the separation space 6.

The step of determining 116 that a threshold pressure level has been reached at the first outlet 10 may be performed by the control unit 12 monitoring the pressure sensed by the pressure sensor 50 arranged to sense the pressure in the first outlet 10.

The step of determining 118 that a threshold differential pressure level has been reached between a pressure at the first outlet 10 and the pressure at the second outlet 9 may be performed by the control unit 12 monitoring the pressures via the pressure sensors 50, 58 at the first and second outlets 10, 9. In essence, the pressure difference between the first and second outlets 10, 9 reaches a substantially constant value once the separation space 6 has been filled with liquid feed mixture.

The step of determining 120 that a threshold differential pressure level has been reached between the pressure at the first outlet 10 and the pressure at the inlet 8 may be performed by the control unit 12 monitoring the pressures via the pressure sensors 50, 54 at the first outlet 10 and the inlet 8. In essence, the pressure difference between the first outlet 10 and the inlet 8 reaches a substantially constant value once the separation space 6 has been filled with the liquid feed mixture.

The step of tracking 122 the pressure at the first outlet 10 and evaluating 124 the pressure change at the first outlet 10 may be performed by the control unit 12. For instance, pressure data from the pressure sensor 50 at the first outlet 10 may be compared with a default pressure change curve stored in a memory unit of the control unit 12. In the memory unit there may be stored at what point along the default pressure change curve the pressure build-up period has passed.

According to embodiments, the step of determining 110 that an abrupt pressure change takes place at the first outlet 10 may comprise a step of:

evaluating 126 a derivative of the pressure at the first outlet 10, or evaluating 128 a derivative of a differential pressure level between a pressure at the first outlet and a pressure at the second outlet, or evaluating 130 a derivative of a differential pressure level between a pressure at the first outlet and a pressure at the inlet 8, or tracking 132 a pressure at the first outlet 10 and evaluating 134 a pressure change at the first outlet 10. In this manner, the abrupt pressure change at the first outlet 10 may be reliably determined.

The step of evaluating 126 a derivative of the pressure at the first outlet 10 may be performed by the control unit 12. The control unit 12 may be configured to determine the derivative of the pressure curve at the first outlet 10. The abrupt pressure change will be indicated by a sudden significant change in the derivative of the pressure curve.

The step of evaluating 128 a derivative of a differential pressure level between a pressure at the first outlet 10 and a pressure at the second outlet 9 may be performed by the control unit 12. Also here the abrupt pressure change will be indicated by a sudden significant change in the derivative, in this case the derivative of a curve indicating the differential pressure level between the pressures at the first and second outlets 10, 9. When the separated heavy phase covers the opening at the radially outer end 30 of the channel 16, the differential pressure level between the pressure at the first and second outlets 10, 9 will change abruptly, in a similar manner as the abrupt pressure change at line b discussed above in connection with FIGS. 4*a* and 4*b*.

The step of evaluating 130 a derivative of a differential pressure level between a pressure at the first outlet 10 and a pressure at the inlet 8 may be performed by the control unit 12. Also here the abrupt pressure change will be indicated by a sudden significant change in the derivative, in this case the derivative of a curve indicating the differential pressure level between the pressures at the first outlet 10 and the inlet 8. When the separated heavy phase covers the opening at the radially outer end 30 of the channel 16, the differential pressure level between the pressure at the first outlet 10 and the inlet 8 will change abruptly, in a similar manner as the abrupt pressure change at line b discussed above in connection with FIGS. 4*a* and 4*b*.

The step of tracking 132 a pressure at the first outlet 10 and evaluating 134 a pressure change at the first outlet 10 may be performed by the control unit 12. For instance, pressure data from the pressure sensor 50 at the first outlet 10 may be compared with a default pressure change curve stored in a memory unit of the control unit 12. In the memory unit there may be stored what pressure change constitutes an abrupt pressure change. Thus, the control unit 12 may determine that an abrupt pressure change takes place.

The step of controlling 112 the centrifugal separator 1 in response to the abrupt pressure change may comprise one of a number of different control measures of the centrifugal separator 1.

According to some embodiments, wherein the centrifugal separator 1 comprises a first outlet valve 14 arranged in fluid communication with the first outlet 10, the step of controlling 112 the centrifugal separator 1 in response to the abrupt pressure change may comprises a step of:

controlling 136 the first outlet valve 14 in response to the abrupt pressure change. In this manner, for instance opening the first outlet valve 14 may be performed only once the abrupt pressure change has taken place. Thus, it may be ensured that separated heavy phase will flow through the first outlet 10.

Accordingly, according to some embodiments, the step of controlling 136 the first outlet valve 14 in response to the abrupt pressure change may comprise a step of:

opening 138 at least partially the first outlet valve 14 to provide a flow of heavy phase through the at least one channel 16, 16' and the first outlet 10.

According to some embodiments, the method 100 may comprise a step of:

determining 140 a first time period, $T_1$, from the step of commencing 104 supply of the liquid feed mixture into the separation space 6 until the step of determining 110 that an abrupt pressure change takes place at the first outlet 10. In this manner, basis may be provided for determining and/or controlling parameters of the operation of the centrifugal separator.

As discussed above, the first time period, $T_1$, may be utilised e.g. for calculating a heavy phase content, $\%_{HP}$, of the liquid feed mixture.

According to some embodiments, the method 100 may comprise a step of:

determining 142 a flow rate of the liquid feed mixture, $Q_{tot}$, through the inlet 8. In this manner, basis may be provided for determining and/or controlling parameters of the operation of the centrifugal separator.

As discussed above, the flow rate of the liquid feed mixture, $Q_{tot}$, may be utilised e.g. for calculating a heavy phase content, $\%_{HP}$, of the liquid feed mixture.

According to some embodiments, wherein each of the at least one channel 16, 16' comprises an outer end 30, 30' at the at least one radially outer portion 18, 18' of the separation space 6, wherein the separation space 6 comprises a heavy phase volume, $V_{HP}$, extending from a radially outermost circumference of the separation space 6 to a radial position at the outer end 30, 30', the method 100 may comprise a step of:

calculating 144 a heavy phase content, $\%_{HP}$, of the liquid feed mixture based on the heavy phase volume, $V_{HP}$, of the separation space 6, the flow rate of the liquid feed mixture flow, $Q_{tot}$, and the first time period, $T_1$.

In this manner, as discussed above, the heavy phase content, $\%_{HP}$, of the liquid feed mixture may be calculated when the method 100 is performed.

As mentioned above, according to one aspect of the present disclosure, the calculation of the heavy phase content, $\%_{HP}$, of the liquid feed mixture may be performed in a method in which the step of controlling 112 the centrifugal separator in response to the abrupt pressure change is omitted. Instead, the determined abrupt pressure change may be utilised in the context of the above mentioned steps of:

determining 140 the first time period, $T_1$, determining 142 the flow rate of the liquid feed mixture, $Q_{tot}$, and calculating 144 the heavy phase content, $\%_{HP}$, of the liquid feed mixture.

According to some embodiments, the step of controlling 112 the centrifugal separator 1 in response to the abrupt pressure change may be additionally based on the heavy phase content, $\%_{HP}$, of the liquid feed mixture as calculated in the step of calculating 144. In this manner, control of the centrifugal separator 1 may be further improved.

For instance, opening of the first outlet valve 14 may be performed a certain time period after the abrupt pressure change has been determined. The length of the time period may be determined based on the heavy phase content, $\%_{HP}$, of the liquid feed mixture. Namely, the first outlet valve 14 may according to some embodiments be opened only once the torus of separated heavy phase accumulated at the circumference of the separation space 6 extends a certain distance radially inside of the outer end 30 of the channel 16. Knowing the heavy phase content, $\%_{HP}$, of the liquid feed mixture and the relevant volume of the separation space 6 radially inside the outer end 30 of the channel 16, the time period may be calculated by the control unit 12.

Similarly, according to embodiments, the step of controlling 112 the centrifugal separator 1 in response to the abrupt pressure change may be performed a specific time period, $T_{spec}$, after an end of the first time period $T_1$. In this manner, it may be ensured that control measures such as the opening of the first outlet valve 14 may be performed only once the torus of separated heavy phase accumulated at the outer periphery of the separation space 6 extends a certain distance radially inside of the outer end 30 of the channel 16. The specific time period, $T_{spec}$, may be selected with knowledge about the range within which the heavy phase content of the liquid feed mixture may vary.

According to some embodiments, the specific time period, $T_{spec}$, may be based on a size of a partial volume of the separation space 6. In this manner, and with knowledge about the range within which the heavy phase content of the liquid feed mixture may vary, it may be ensured that control measures such as the opening of the first outlet valve 14 may be performed only once the torus of separated heavy phase accumulated at the outer periphery of the separation space 6 extends a certain distance radially inside of the outer end 30 of the channel 16.

According to some embodiments, the liquid feed mixture and the heavy phase may comprise solid matter content. Mentioned purely as examples, the solid matter content may comprise e.g. yeast, or other cells.

According to embodiments, the method 100 may comprise a step of:

controlling 146 a flow of the light phase in the second outlet 9. In this manner, the back pressure may be controlled by controlling the flow of the light phase in the second outlet 9. For instance, the back pressure may be increased in order to avoid too low a pressure at the first outlet 10.

The step of controlling 146 a flow of the light phase in the second outlet 9 may be performed by the control unit 12. The control unit 12 may control the flow of the light phase via the second outlet valve 56.

According to embodiments, the rotor 11 may comprise intermittently openable outlet openings 34, 34', and the method 100 may comprise steps of:

discharging 148 one or more fractions of the liquid feed mixture via the outlet openings, and repeating 150 at least the steps of: rotating 102 the rotor 11, commencing 104 supply of the liquid feed mixture, separating 106 the liquid feed mixture, determining 108 that pressure build-up period has passed, determining 110 abrupt pressure change, and controlling 112 the centrifugal separator 1, of the method 100. In this manner, the method may be performed each time after the step of discharging via the outlet openings.

One skilled in the art will appreciate that the method 100 for controlling a centrifugal separator may be implemented by programmed instructions. These programmed instructions are typically constituted by a computer program, which, when it is executed in the control unit 12, ensures that the control unit 12 carries out the desired control, such as the method steps 102-150 according to the invention. The computer program is usually part of a computer programme product which comprises a suitable digital storage medium on which the computer program is stored.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the invention, as defined by the appended claims.

For instance, the control unit 12 may form part of a distributed control system, i.e. comprising more than one processing unit for controlling different aspects of the centrifugal separator, the rotational speed of the separator rotor 11, measurements being made, the intermittent opening of outlet openings, etc.

In the shown embodiments, the heavy phase is lead out of the rotor at a larger radial distance than the light phase. In alternative embodiments, the heavy phase may be lead out of the rotor at a smaller radial distance than the light phase. Moreover, in the shown embodiments, the heavy phase and the light phase are lead out of the rotor at the same axial end of the rotor. In alternative embodiments, the heavy phase and the light phase may be lead out of the rotor at different axial ends of the rotor.

The invention claimed is:

1. A method of controlling a centrifugal separator configured to separate a heavy phase and a light phase from a liquid feed mixture, the centrifugal separator comprising:

a rotor delimiting therein a separation space, an inlet for the liquid feed mixture leading into the separation space, a first outlet for the heavy phase having a first outlet valve, a second outlet for the light phase, and at least one channel extending from at least one radially outer portion of the separation space towards a central portion of the rotor, wherein the first outlet is arranged in fluid communication with the at least one channel, and wherein the method comprises steps of:

rotating the rotor, commencing supply of the liquid feed mixture into the separation space via the inlet, separating the liquid feed mixture into at least the heavy phase and the light phase in the separation space, and determining that a pressure build-up period has passed, and thereafter determining that a rate of pressure change takes place at the first outlet, and controlling the centrifugal separator in response to the rate of pressure change exceeding a predetermined value, wherein controlling the centrifugal separator in response to the rate of pressure change comprises increasing an extent of opening of the first outlet valve.

2. The method according to claim 1, wherein the step of determining that a pressure build-up period has passed comprises a step of:

determining that a predetermined time interval has passed from the step of commencing supply of the liquid feed mixture into the separation space, or determining that a threshold pressure level has been reached at the first outlet, or determining that a threshold differential pressure level has been reached between a pressure at the first outlet and a pressure at the second outlet, or determining that a threshold differential pressure level has been reached between a pressure at the first outlet and a pressure at the inlet, or tracking a pressure at the first outlet and evaluating a pressure change at the first outlet.

3. The method according to claim 1, wherein the step of determining that a rate of pressure change takes place at the first outlet comprises a step of:

evaluating a derivative of a differential pressure level between a pressure at the first outlet and a pressure at the second outlet, or evaluating a derivative of a differential pressure level between a pressure at the first outlet and a pressure at the inlet.

4. The method according to claim 1, comprising a step of:

determining a first time period, $T_1$, from the step of commencing supply of the liquid feed mixture into the separation space until the step of determining that a rate of pressure change takes place at the first outlet.

5. The method according to claim 4, comprising a step of:

determining a flow rate of the liquid feed mixture, $Q_{tot}$, through the inlet.

6. The method according to claim 5, wherein each of the at least one channel comprises an outer end at the at least one radially outer portion of the separation space, wherein the separation space comprises a heavy phase volume, $V_{HP}$, extending from a radially outermost circumference of the separation space to a radial position at the outer end, and wherein the method comprises a step of:

calculating a heavy phase content of the liquid feed mixture based on the heavy phase volume, $V_{HP}$, of the separation space, the flow rate of the liquid feed mixture flow, $Q_{tot}$, and the first time period, $T_1$.

7. The method according to claim 6, wherein the step of controlling the centrifugal separator in response to the rate of pressure change is additionally based on the heavy phase content of the liquid feed mixture as calculated in the step of calculating.

8. The method according to claim 4, wherein the step of controlling the centrifugal separator in response to the rate of pressure change is performed a specific time period, $T_{spec}$, after an end of the first time period, $T_1$.

9. The method according to claim 8, wherein the specific time period, $T_{spec}$, is based on a size of a partial volume of the separation space.

10. The method according to claim 1, wherein the liquid feed mixture and the heavy phase comprise solid matter content.

11. The method according to claim 1, comprising a step of:

controlling a flow of the light phase in the second outlet.

12. The method according to claim 1, wherein the rotor comprises intermittently openable outlet openings, and wherein the method comprises steps of:

discharging one or more fractions of the liquid feed mixture via the outlet openings, and repeating at least the steps of: rotating the rotor, commencing supply of the liquid feed mixture, separating the liquid feed mixture, determining that pressure build-up period has passed, determining a rate of pressure change, and controlling the centrifugal separator, of the method.

13. A centrifugal separator configured to separate a heavy phase and a light phase from a liquid feed mixture, the centrifugal separator comprising:

a rotor delimiting therein a separation space, an inlet for the liquid feed mixture leading into the separation space, a first outlet for the heavy phase having a first outlet valve, a second outlet for the light phase, and at least one channel extending from at least one radially outer portion of the separation space towards a central portion of the rotor, wherein the first outlet is arranged in fluid communication with the at least one channel, wherein the centrifugal separator comprises a control unit and a pressure sensor connected to the control unit, wherein the pressure sensor is arranged to sense a pressure in the first outlet, and wherein the control unit is configured for:

determining commencement of supply of the liquid feed mixture into the separation space, determining a rate of pressure change above a predetermined value in a pressure in the first outlet, and controlling the centrifugal separator in response to the rate of pressure change exceeding the predetermined value, wherein controlling the centrifugal separator in response to the rate of pressure change comprises increasing an extent of opening of the first outlet valve.

14. The centrifugal separator according to claim 13, wherein the control unit is further configured for:

determining that a pressure build-up period has passed.

15. The centrifugal separator according to claim 13, wherein the control unit is configured for:

determining a first time period, $T_1$, from the commencement of supply of the liquid feed mixture into the separation space until the determining that a rate of pressure change takes place at the first outlet.

16. The centrifugal separator according to claim 15, comprising a flow meter at the inlet, wherein the control unit is configured for:

determining a flow rate of the liquid feed mixture, $Q_{tot}$, through the inlet.

17. The centrifugal separator according to claim 16, wherein the control unit is configured for:

calculating heavy phase content in the liquid feed mixture based on a heavy phase volume, $V_{HP}$, of the separation space, the flow rate of the liquid feed mixture flow, $Q_{tot}$, and the first time period, $T_1$.

18. The centrifugal separator according to claim 13, comprising a second outlet valve arranged in fluid communication with the second outlet, wherein the second outlet valve is connected to the control unit, and wherein the control unit is configured for:

controlling a flow of the light phase in the second outlet.

19. The centrifugal separator according to claim 13, wherein the rotor comprises intermittently openable outlet openings.

20. The centrifugal separator according to claim 13, wherein each of the at least one channel comprises a tube, which tube extends from the at least one radially outer portion of the separation space towards the central portion of the rotor, and wherein the first outlet is arranged in fluid communication with the tube.

21. The method according to claim 1, wherein the rate of pressure change is a rate of pressure increase.

22. The centrifugal separator according to claim 13, wherein the rate of pressure change is a rate of pressure increase.

23. The method according to claim 1, wherein increasing an extent of opening of the first outlet valve comprises opening the first outlet valve from a closed state to being open a first extent.

24. The method according to claim 1, wherein increasing an extent of opening of the first outlet valve comprises increasing the extent of opening from a first open amount to a second open amount greater than the first open amount.

25. The centrifugal separator according to claim 13, wherein increasing an extent of opening of the first outlet valve comprises opening the first outlet valve from a closed state to being open a first extent.

* * * * *